United States Patent
Chockalingapuramravindran et al.

(10) Patent No.: US 12,039,740 B2
(45) Date of Patent: Jul. 16, 2024

(54) VECTORIZED BILINEAR SHIFT FOR REPLACING GRID SAMPLING IN OPTICAL FLOW ESTIMATION

(71) Applicant: QUALCOMM Incorporated, San Diego, CA (US)

(72) Inventors: Rajeswaran Chockalingapuramravindran, San Diego, CA (US); Kristopher Urquhart, Poway, CA (US); Jamie Menjay Lin, San Diego, CA (US); Risheek Garrepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 17/549,768

(22) Filed: Dec. 13, 2021

(65) Prior Publication Data
US 2023/0186487 A1 Jun. 15, 2023

(51) Int. Cl.
*G06K 9/00* (2022.01)
*G06T 7/215* (2017.01)

(52) U.S. Cl.
CPC .... *G06T 7/215* (2017.01); *G06T 2207/10016* (2013.01); *G06T 2207/20084* (2013.01)

(58) Field of Classification Search
CPC .......................................... G06T 2207/10016
See application file for complete search history.

(56) References Cited

U.S. PATENT DOCUMENTS

| | | | |
|---|---|---|---|
| 5,125,042 A | 6/1992 | Kerr et al. | |
| 11,640,668 B2* | 5/2023 | Lin | G06T 7/248 |
| | | | 382/103 |
| 2007/0292047 A1 | 12/2007 | Jiao et al. | |
| 2009/0079876 A1* | 3/2009 | Takeshima | G06T 3/4069 |
| | | | 348/E5.062 |
| 2010/0272311 A1* | 10/2010 | Nir | G06T 7/269 |
| | | | 382/100 |
| 2011/0002532 A1 | 1/2011 | Frakes et al. | |
| 2019/0147283 A1* | 5/2019 | Giering | G06V 10/82 |
| | | | 382/103 |
| 2020/0012940 A1* | 1/2020 | Liu | H04N 7/0135 |
| 2021/0392334 A1* | 12/2021 | Esenlik | H04N 19/117 |
| 2022/0101539 A1* | 3/2022 | Lin | G06T 7/215 |

OTHER PUBLICATIONS

International Search Report and Written Opinion—PCT/US2022/048100—ISA/EPO—Feb. 27, 2023.
Kim Y., et al., "RPM-Net: Robust Pixel-Level Matching Networks for Self-Supervised Video Object Segmentation", Arxiv.org, Cornell University Library, 201 Olin Library Cornell University Ithaca, NY 14853, Sep. 29, 2019, 10 pages, XP081485839, Abstract, p. 3, Paragraph 2.3-p. 4, paragraph 3.3.

* cited by examiner

*Primary Examiner* — Hadi Akhavannik
(74) *Attorney, Agent, or Firm* — QUALCOMM Incorporated

(57) ABSTRACT

A computer-implemented method includes receiving a first input. The first input is interpolated based on a first shift along a first dimension and a second shift along a second dimension. A first output is generated based on the interpolated first input. The first output corresponds to a vectorized bilinear shift of the first input for use in place of grid sampling algorithms.

20 Claims, 10 Drawing Sheets

VECTORIZED BILINEAR SHIFT FOR REPLACING GRID SAMPLING IN OPTICAL FLOW ESTIMATION

FIELD OF DISCLOSURE

Aspects of the present disclosure generally relate to a vectorized bilinear shift for replacing grid sampling in optical flow estimation.

BACKGROUND

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Deep learning and machine learning engineers often design models and algorithms with little, or in some cases, no knowledge of the hardware that will execute the models and algorithms and how the hardware may execute the models and algorithms. This may lead to inefficient and costly operations (e.g., increased processing duration, memory consumption, and/or power consumption) on the hardware.

SUMMARY

The present disclosure is set forth in the independent claims, respectively. Some aspects of the disclosure are described in the dependent claims.

In one aspect of the present disclosure, a computer-implemented method includes receiving a first input. The method further includes interpolating the first input based on a first shift along a first dimension and a second shift along a second dimension. The method still further includes generating a first output based on the interpolated first input.

Another aspect of the present disclosure is directed to an apparatus including means for receiving a first input. The apparatus further includes means for interpolating the first input based on a first shift along a first dimension and a second shift along a second dimension. The apparatus still further includes means for generating a first output based on the interpolated first input.

In another aspect of the present disclosure, a non-transitory computer-readable medium with non-transitory program code recorded thereon is disclosed. The program code is executed by a processor and includes program code to receive a first input. The program code further includes program code to interpolate the first input based on a first shift along a first dimension and a second shift along a second dimension. The program code still further includes program code to generate a first output based on the interpolated first input.

Another aspect of the present disclosure is directed to an apparatus having a memory and one or more processors coupled to the memory. The processor(s) is configured to receive a first input. The processor(s) is further configured to interpolate the first input based on a first shift along a first dimension and a second shift along a second dimension. The processor(s) is still further configured to generate a first output based on the interpolated first input.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
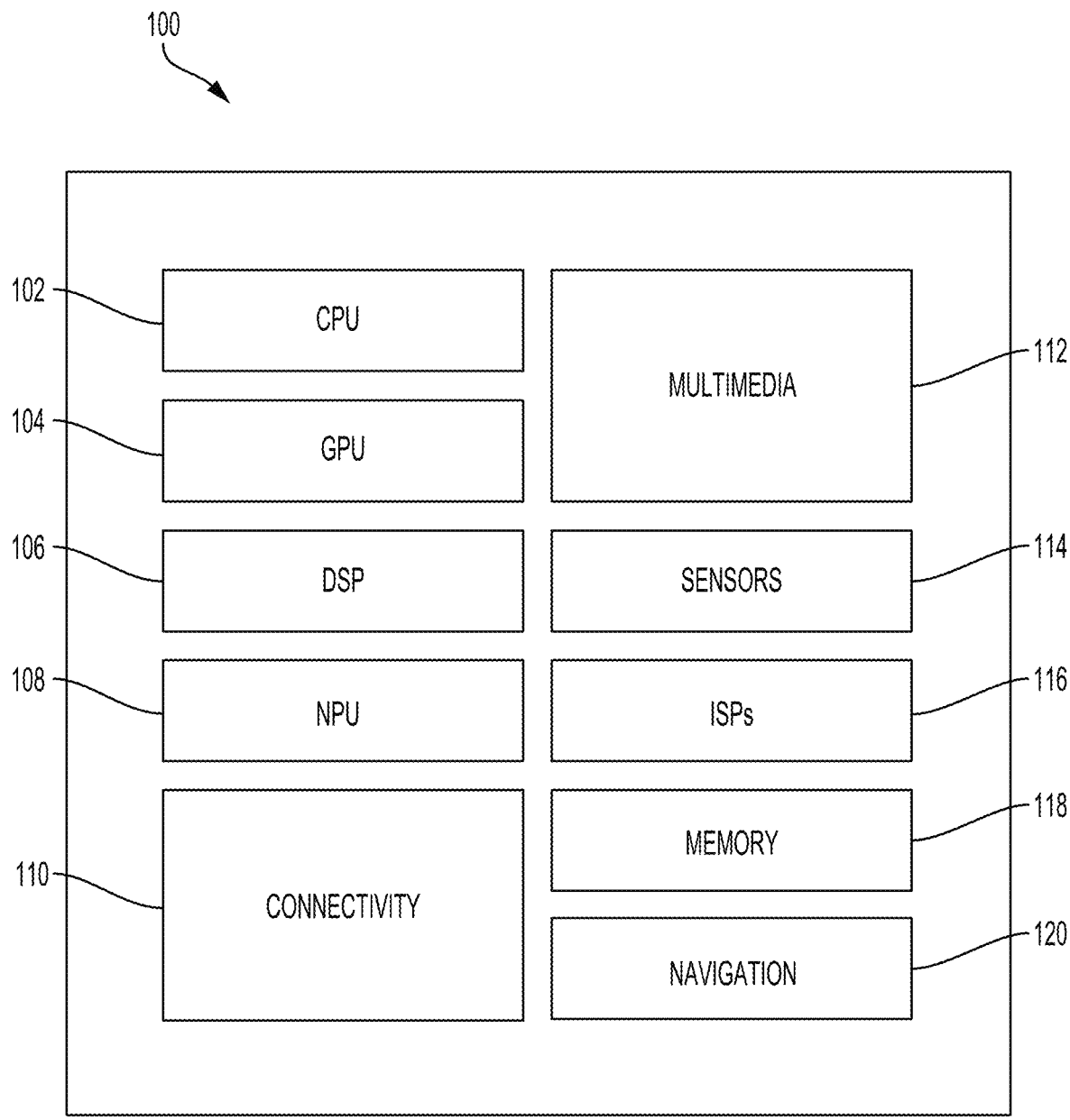
FIG. 1 illustrates an example implementation of a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, deep learning and machine learning engineers often design models and algorithms with little, or in some cases, no knowledge of the hardware that will execute the models and algorithms and how the hardware may execute the models and algorithms. This may lead to inefficient and costly operations (e.g., increased processing duration, memory consumption, and/or power consumption) on the hardware.

For instance, one popular application of deep learning models is optical flow estimation. Optical flow estimation is the task of estimating per-pixel motion between frames of the video. During optical flow estimation, algorithms using neural network structures, such as a recurrent neural network (RNN) or convolutional neural network (CNN), may sample numerous points over a correlation plane. This sampling process is commonly referred to as grid sampling, and may be computationally expensive on the hardware. In grid sampling, for a given input and a flow-field grid, the process computes an output using input values and pixel locations from the grid. In the spatial four-dimensional (4-D) case, for an input with shape (Batches, Channels, H_in, W_in) and a grid with shape (Batches, H_out, W_out, 2), the output produces shape (Batches, Channels, H_out, W_out). Typically, the flow of operations for this functionality may include (1) slicing the grid into smaller chunks, (2) computing interpolation locations in input from grid values, and (3) interpolating output values using grid locations and the input data.

These operations may be computationally expensive or require infrastructure changes on the device side. For example, one conventional optical flow estimation algorithm may use grid sampling for updating a correlation used to ascertain an optical flow volume. The optical flow volume is a measure of the displacement of pixels between two frames in a video. Grid sampling in this conventional approach involves a series of pointwise grid operations followed by series of bilinear interpolation operations. However, this operation may not be well-suited for execution on hardware in a vectorized fashion, thus limiting processing efficiency. Rather, grid sampling operations in this approach, and many other conventional optical flow estimation networks, have a regular pattern of (monotonically increasing) sampling points of the intermediate correlation tensor, which holds the displacement information.

To address these and other challenges, aspects of the present disclosure are directed to improved model design techniques. Aspects of the present disclosure replace such unfavorable and computationally expensive grid sampling operations with a more hardware-friendly approach that enables vectorizable operation. For clarity, vectorization refers to the process of converting an algorithm from operating on a single value at a time to operating on a set of values (e.g., a vector) at one time. In accordance with aspects of the present disclosure, a bilinear shift technique may be applied to enable vectorized processing.

Because the grid input may be uniform and based on a shift or lambda along an x-dimension and a y-dimension, the grid sample operation may be resolved into a bilinear operation associated with a two-dimensional (2-D) shift that resolves into known element-wise operators on hardware. Accordingly, aspects of the present disclosure advantageously may be easily chunk-able (e.g., capable of being divided into conceptual chunks) into further smaller operators. For instance, given an input tensor (INP), the shift along the x-dimension (e.g., centx) and the shift along the y-dimension (e.g., centy), the bilinear operation may be executed to provide an output that is equivalent to the original grid sampling operation. In the bilinear operation, the input may be split into two equal parts. A first part may be indexed by a one pixel offset along the x-dimension. The first part may be interpolated using centx and (1-centx). A second part may be indexed by a one pixel offset along the y-dimension. Then the second part may be interpolated using centy and (1-centy).

FIG. 1 illustrates an example implementation of a system-on-a-chip (SOC) 100, which may include a central processing unit (CPU) 102 or a multi-core CPU configured for applying vectorized bilinear shift in optical flow estimation. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104.

The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive a first input. The general-purpose processor 102 may also include code to interpolate the first input based on a first shift along a first dimension and a second shift along a second dimension. The general-purpose processor 102 may also include code to generate a first output based on the interpolated first input.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2:
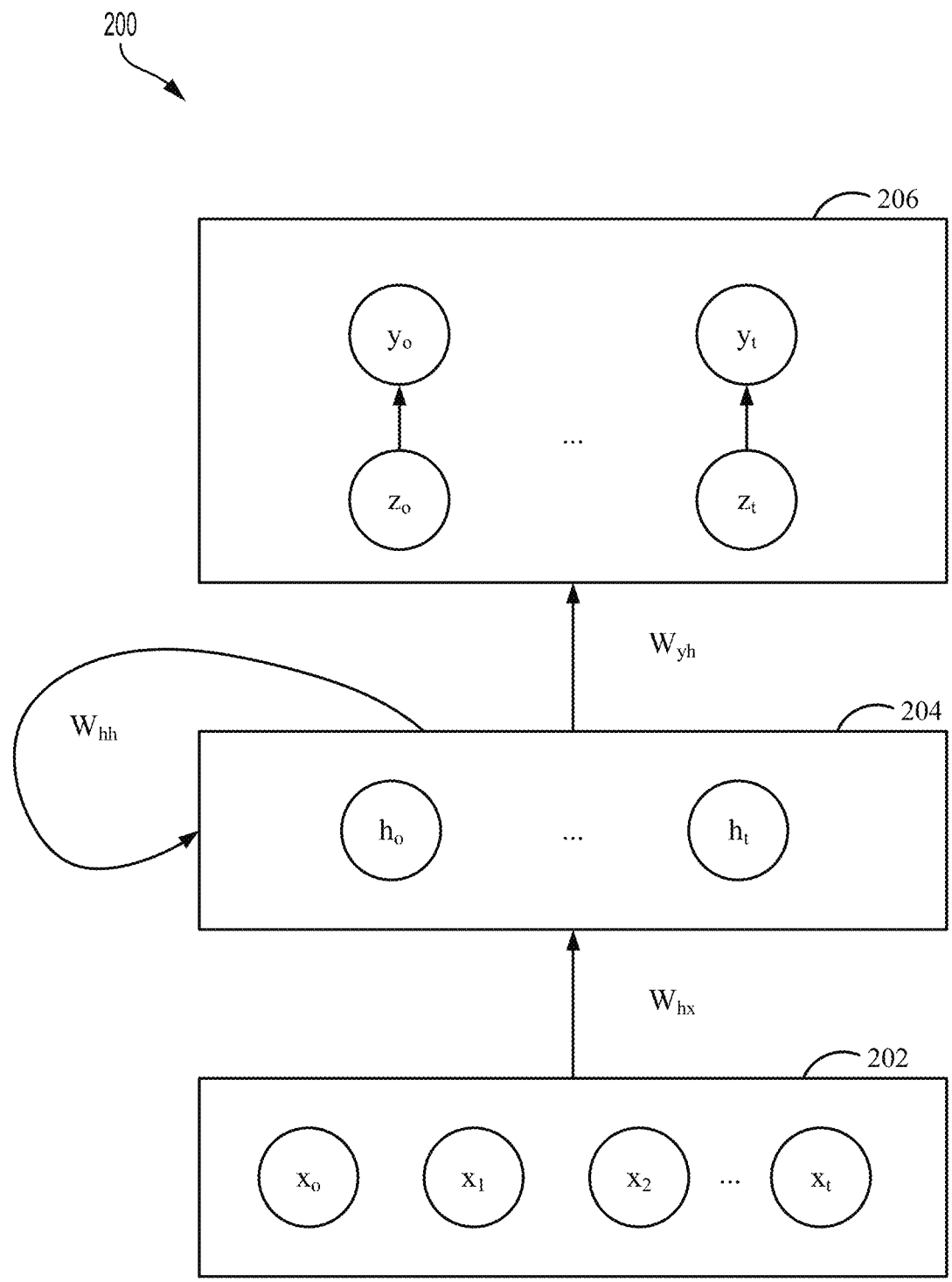
FIG. 2 is a block diagram illustrating an exemplary recurrent neural network in accordance with aspects of the present disclosure.

FIG. 2 is a block diagram illustrating an example recurrent neural network (RNN) 200. The recurrent neural network 200 includes an input layer 202, a hidden layer 204 with recurrent connections, and an output layer 206. Given an input sequence X with multiple input vectors $x_T$ (e.g., $X=\{x_0, x_1, x_2 \ldots x_T\}$), the recurrent neural network 200 will predict a classification label $y_t$ for each output vector $z_T$ of an output sequence Z (e.g., $Z=\{z_0 \ldots z_T\}$). For FIG. 2A, $x_t \in \mathbb{R}^N$, $y_t \in \mathbb{R}^C$, and $z_t \in \mathbb{R}^C$. As shown in FIG. 2A, a hidden layer 204 with M units (e.g., $h_0 \ldots h_t$) is specified between the input layer 202 and the output layer 206. The M units of the hidden layer 204 store information on the previous values (t<t) of the input sequence X. The M units may be computational nodes (e.g., artificial neurons). In some configurations, the recurrent neural network 200 receives an input $x_T$ and generates a classification label $y_t$ of the output $z_T$ by iterating the equations:

$$s_t = W_{hx}x_{t-1} + W_{hh}h_{t-1} + b_h \quad (1)$$

$$h_t = f(s_t) \quad (2)$$

$$o_t = W_{yh}h_t + b_y \quad (3)$$

$$y_t = g(o_t), \quad (4)$$

where $W_{hx}$, $W_{hh}$, and $W_{yh}$ are the weight matrices, $b_h$ and $b_y$ are the biases, $s_t \in \mathbb{R}^M$ and $o_t \in \mathbb{R}^C$ are inputs to the hidden layer 204 and the output layer 206, respectively, and $f$ and $g$ are nonlinear functions. The function $f$ may comprise a rectifier linear unit (RELU) and, in some aspects, the function g may comprise a linear function or a softmax function. In addition, the nodes of the hidden layer 204 are initialized to a fixed bias bi such that at t=0, $h_0$=bi. In some aspects, bi may be set to zero (e.g., bi=0). The objective function, C(θ), for a recurrent neural network with a single training pair (x,y) is defined as $C(\theta)=\Sigma_t L_t(z, y(\theta))$, where θ represents the set of parameters (e.g., weights and biases) in the recurrent neural network. For regression problems, $L_t=\|(z_t-y_t)^2\|$ and for multi-class classification problems, $L_t=-\Sigma_j z_{tj} \log(y_{tj})$.

Figure 3:
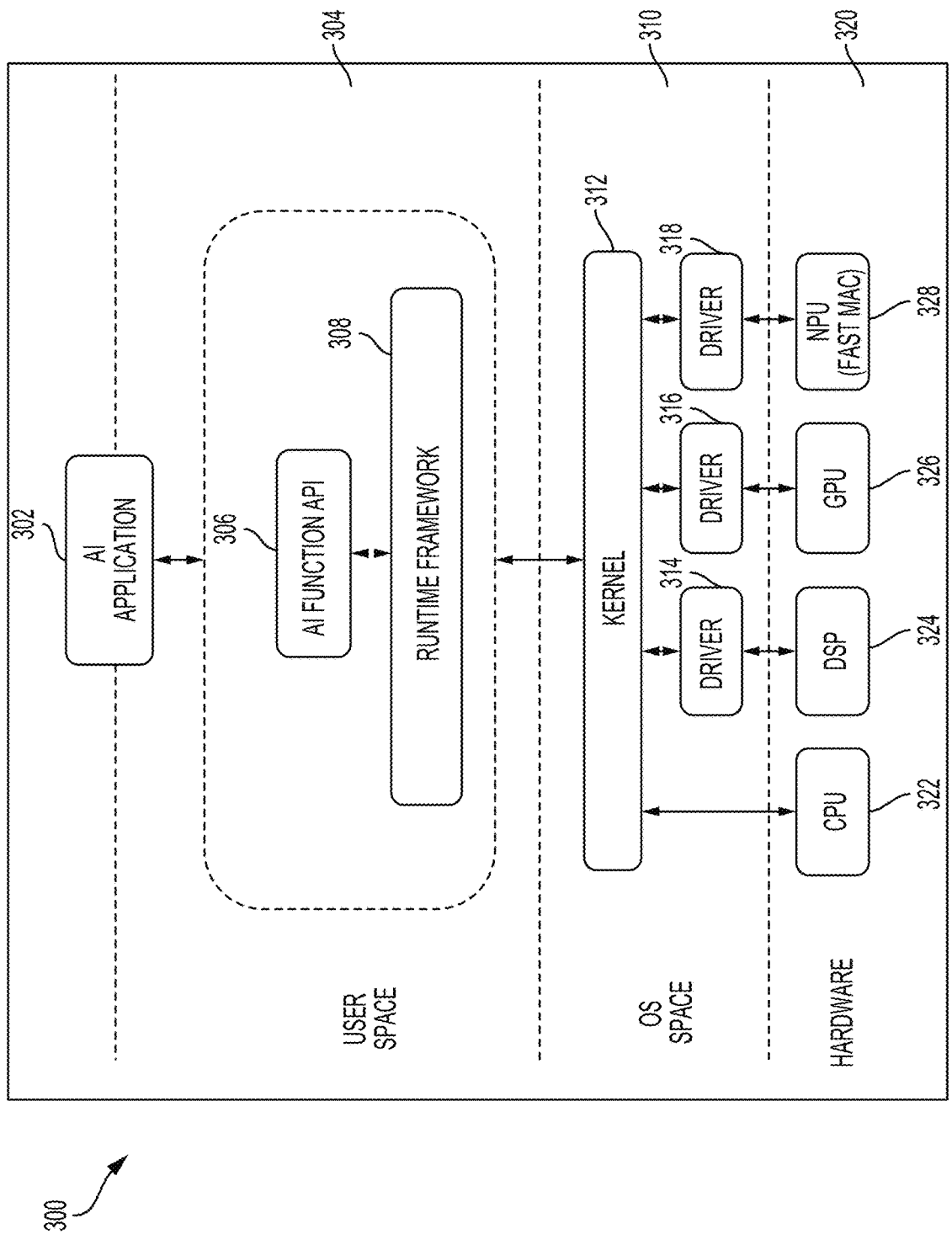
FIG. 3 is a block diagram illustrating an exemplary software architecture 300 that may modularize artificial intelligence (AI) functions.

FIG. 3 is a block diagram illustrating an exemplary software architecture 300 that may modularize artificial intelligence (AI) functions. Using the architecture, applications may be designed that may cause various processing blocks of a system-on-a-chip (SOC) 320 (for example a CPU 322, a DSP 324, a GPU 326, and/or an NPU 328) to support adaptive rounding as disclosed for post-training quantization for an AI application 302, according to aspects of the present disclosure.

The AI application 302 may be configured to call functions defined in a user space 304 that may, for example, provide for the detection and recognition of a scene indicative of the location in which the device currently operates. The AI application 302 may, for example, configure a microphone and a camera differently depending on whether the recognized scene is an office, a lecture hall, a restaurant, or an outdoor setting such as a lake. The AI application 302 may make a request to compiled program code associated with a library defined in an AI function application programming interface (API) 306. This request may ultimately rely on the output of a deep neural network configured to provide an inference response based on video and positioning data, for example.

A run-time engine 308, which may be compiled code of a runtime framework, may be further accessible to the AI application 302. The AI application 302 may cause the run-time engine, for example, to request an inference at a particular time interval or triggered by an event detected by the user interface of the application. When caused to provide an inference response, the run-time engine may in turn send a signal to an operating system in an operating system (OS) space, such as a Linux Kernel 312, running on the SOC 320. The operating system, in turn, may cause a continuous relaxation of quantization to be performed on the CPU 322, the DSP 324, the GPU 326, the NPU 328, or some combination thereof. The CPU 322 may be accessed directly by the operating system, and other processing blocks may be accessed through a driver, such as a driver 314, 316, or 318 for, respectively, the DSP 324, the GPU 326, or the NPU 328. In the exemplary example, the deep neural network may be configured to run on a combination of processing blocks, such as the CPU 322, the DSP 324, and the GPU 326, or may be run on the NPU 328.

The application 302 (e.g., an AI application) may be configured to call functions defined in a user space 304 that may, for example, provide for the detection and recognition of a scene indicative of the location in which the device currently operates. The application 302 may, for example, configure a microphone and a camera differently depending on whether the recognized scene is an office, a lecture hall, a restaurant, or an outdoor setting such as a lake. The application 302 may make a request to compiled program code associated with a library defined in a SceneDetect application programming interface (API) 306 to provide an estimate of the current scene. This request may ultimately rely on the output of a differential neural network configured to provide scene estimates based on video and positioning data, for example.

A run-time engine 308, which may be compiled code of a Runtime Framework, may be further accessible to the application 302. The application 302 may cause the run-time engine, for example, to request a scene estimate at a particular time interval or triggered by an event detected by the user interface of the application. When caused to estimate the scene, the run-time engine may in turn send a signal to an operating system 310, such as a Linux Kernel 312, running on the SOC 320. The operating system 310, in turn, may cause a computation to be performed on the CPU 322, the DSP 324, the GPU 326, the NPU 328, or some combination thereof. The CPU 322 may be accessed directly by the operating system, and other processing blocks may be accessed through a driver, such as a driver 314-318 for a DSP 324, for a GPU 326, or for an NPU 328. In the exemplary example, the differential neural network may be configured to run on a combination of processing blocks, such as a CPU 322 and a GPU 326, or may be run on an NPU 328.

As described, one popular application of deep learning models is optical flow estimation. Optical flow estimation is the task of estimating per-pixel motion between frames of the video. During optical flow estimation, algorithms using neural network structures such as a recurrent neural network (RNN) or convolutional neural network (CNN), may sample numerous points over a correlation plane. This sampling process is commonly referred to as grid sampling, and may be computationally expensive on the hardware. In grid sampling, for a given input and a flow-field grid, the process computes an output using input values and pixel locations from grid. In the spatial four-dimensional (4-D) case, for an input with shape (Batches, Channels, H_in, W_in) and a grid with shape (Batches, H_out, W_out, 2), the output produces shape (Batches, Channels, H_out, W_out). Typically, the flow of operations for this functionality may include (1) slicing the grid into smaller chunks, (2) computing interpolation locations in input from grid values, and (3) interpolating output values using grid locations and the input data.

These operations may be computationally expensive or require infrastructure changes on the device side. For example, one conventional optical flow estimation algorithm may use grid sampling for updating a correlation used to ascertain an optical flow volume. An optical flow volume is a measure of the displacement of pixels between two frames in a video. Grid sampling in this conventional approach involves a series of pointwise grid operations followed by series of bilinear interpolation operations. However, this operation may not be well-suited for execution on hardware in a vectorized fashion. Rather, grid sampling operations in this approach, and many other conventional optical flow estimation networks, have a regular pattern of (monotonically increasing) sampling points of correlation volume.

To address these and other challenges, aspects of the present disclosure are directed to improved model design techniques. Aspects of the present disclosure replace such unfavorable and computationally expensive operation with a more hardware-friendly approach that enables vectorizable operation. In accordance with aspects of the present disclosure, a vectorized bilinear shift technique may replace grid sampling in optical flow estimation.

Because the grid input may be uniform and based on a shift or lambda along an x-dimension and a y-dimension, the grid sample operation may be resolved into a bilinear operation associated with a two-dimensional (2-D) shift that resolves into known element-wise operators on hardware. Accordingly, aspects of the present disclosure advantageously may be easily chunk-able (e.g., capable of being divided into conceptual chunks) into further smaller operators. For instance, given an input tensor (INP), the shift along the x-dimension (e.g., centx) and the shift along the y-dimension (e.g., centy), the bilinear operation may be executed to provide an output that is equivalent to the original grid sampling operation. In the bilinear operation, the input may be split into two equal parts. A first part may be indexed by a one pixel offset along the x-dimension. The first part may be interpolated using centx and (1-centx). A second part may be indexed by a one pixel offset along the y-dimension. Then, the second part may be interpolated using centy and (1-centy).

Figure 4:
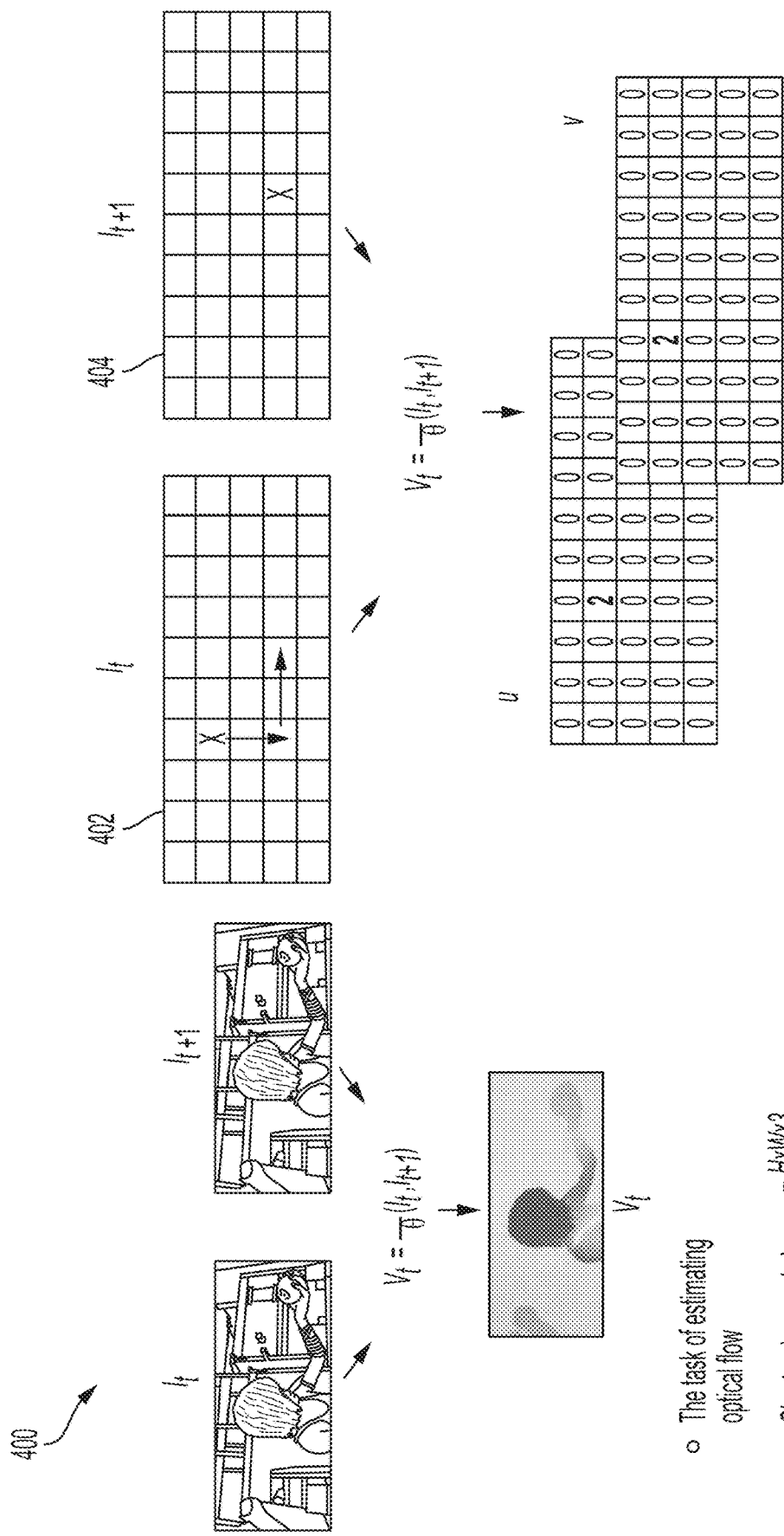
FIG. 4 is a block diagram illustrating an example of optical flow estimation, in accordance with aspects of the present disclosure.

FIG. 4 is a block diagram illustrating an example of optical flow estimation 400, in accordance with aspects of the present disclosure. Referring to FIG. 4, the optical flow estimation 400 may be determined between a first video frame $I_t$ and a second video frame $I_{t+1}$, where $I_t$ and $I_{t+1} \in \mathbb{R}^{H \times W \times 3}$. A flow field $V^t$ may be estimated between the first video frame $I_t$ and a second video frame $I_{t-1}$, where the flow field is expressed as $V^t = f(I_t, I_{t+1})$. A flow field is a three-dimensional sample space that returns a vector at every point indicating an attraction toward objects of interest. Each width and height dimension is the same, though the images displayed in the first frame $I_t$ and the second frame $I_{t+1}$ may have three channels (e.g., red, green, blue), while the optical flow may have two channels (e.g., x-dimension and y-dimension). Grids 402 and 404 may correspond to the first frame $I_t$ and the second frame $I_{t+1}$, respectively. Each field in the grids 402 and 404 may represent a pixel in the respective video frame. In sequence frame I(t) and I(t+1), an image in the first video frame reflected by an active pixel x may move two grid fields down and two grid fields to the right. Vectors illustrating the motion in the x-dimension and the y-dimension may be determined via the bilinear shift technique and are shown via the arrows in grid 402 and the active pixel x shown in grid 404. In turn, the bilinear shift may be used to determine an estimate of the optical flow. As shown in FIG. 4, the optical flow represents the magnitude (e.g., zero and two) at a pixel of the sequence frame I(t) that moves in the y-direction and the x-direction shown via grids 402 and 404.

Figure 5:
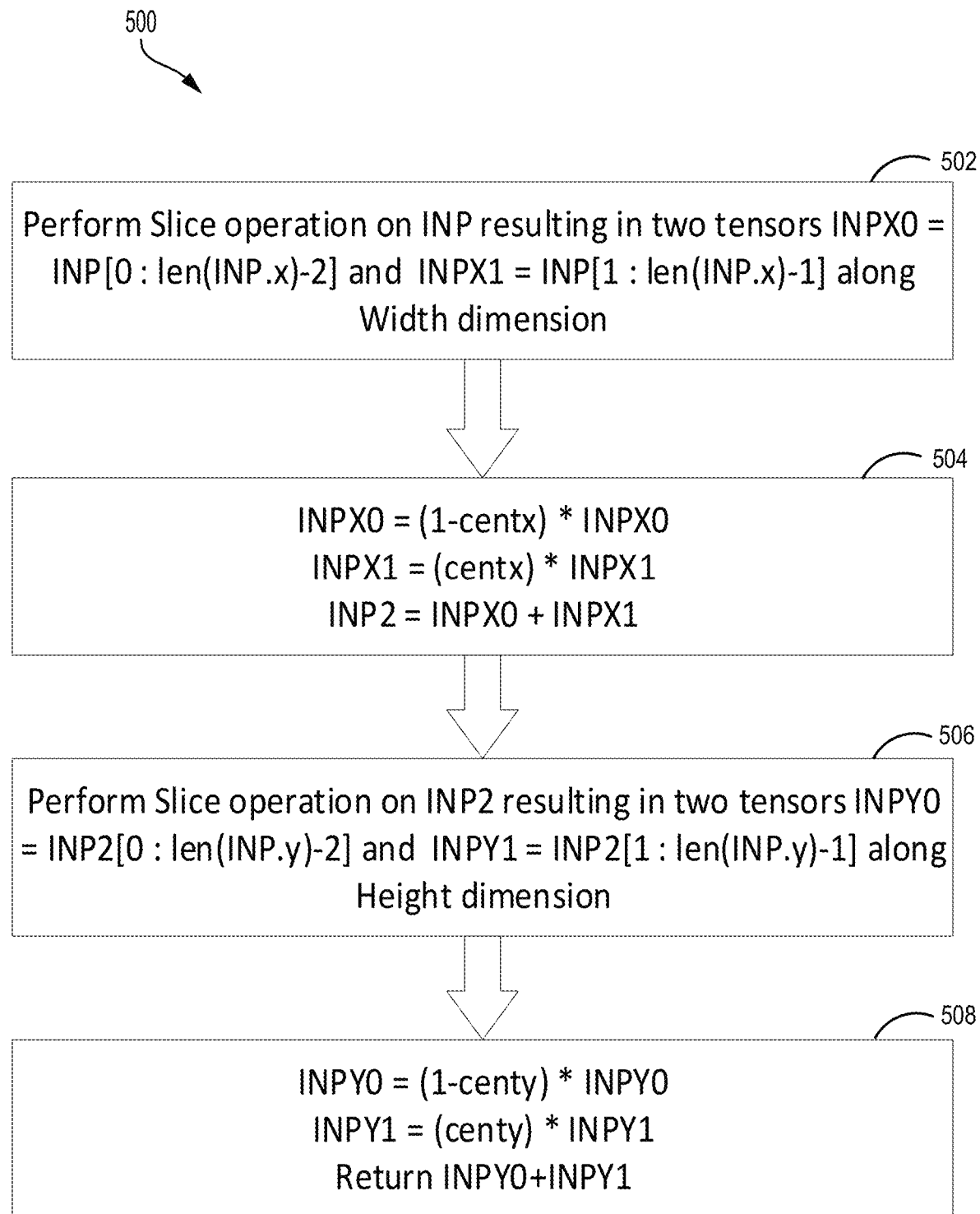
FIG. 5 is a flow diagram illustrating an example process for determining a bilinear shift of an input, in accordance with aspects of the present disclosure.

FIG. 5 is a flow diagram illustrating an example process 500 for determining a bilinear shift of an input, in accordance with aspects of the present disclosure. Referring to FIG. 5, at block 502, a first input tensor INP may be received. The first input tensor INP may be subjected to a slice operation. The slice operation may slice or separate the first input tensor into two tensors: a first tensor INPX0=INP[0:len(INP.x)-2] and a second tensor INPX1=INP[1:len(INP.x)-1] along a width dimension, where len( ) is a function that determines the length of the input tensor INP. In some aspects, the first tensor INPX0 and the second tensor INPX1 may be equal in size. In addition, the first tensor INPX0 and the second tensor INPX1 may be indexed by a one pixel offset.

At block 504, the input may be interpolated along the x-direction based on a shift along the x-dimension (centx) and a complement of the shift (1-centx). As such, the first tensor INPX0=(1-centx) INPX0 and the second tensor INPX1=(centx)*INPX1 may be used to determine a second input tensor INP2, where INP2=INPX0+INPX1.

A similar process to blocks 502 and 504 may be then be performed on the second input along the y-dimension. That is, at block 506, second input tensor INP2 may be processed. The second input tensor INP2 may be subjected to the slice operation. The slice operation may slice or separate the second input tensor into two tensors, a third tensor INPY0=INP2[0:len(INP.y)-2], and a fourth tensor INPY1=INP2[1:len(INP.y)-1] along a height dimension. In some aspects, the third tensor INPY0 and the fourth tensor INPY1 may be equal in size. In addition, the third tensor INPX0 and the fourth tensor INPX1 may be indexed by a one pixel offset.

At block 508, the input may be interpolated along the y-direction based on a shift along the y-dimension (centy) and a complement of the shift (1-centy). As such, the third tensor INPY0=(1-centy)*INPY0 and the fourth tensor INPY1=(centy)*INPY1 may be used to determine a third input tensor INP3, where INP3=INPY0+INPY1.

The third input tensor INP3 may be returned as an output vector for subsequent processing. For example, the output vector may be used to determine an optical flow estimate, for instance, between a first video frame and a second video frame, for example.

Accordingly, aspects of the present disclosure may provide numerous improvements and advantages. For instance, aspects of the present disclosure may be highly parallelizable on hardware using threads, for example. Additionally, the advantages of the present disclosure may be realized without infrastructure changes unlike the conventional grid-based approaches.

Figure 6:
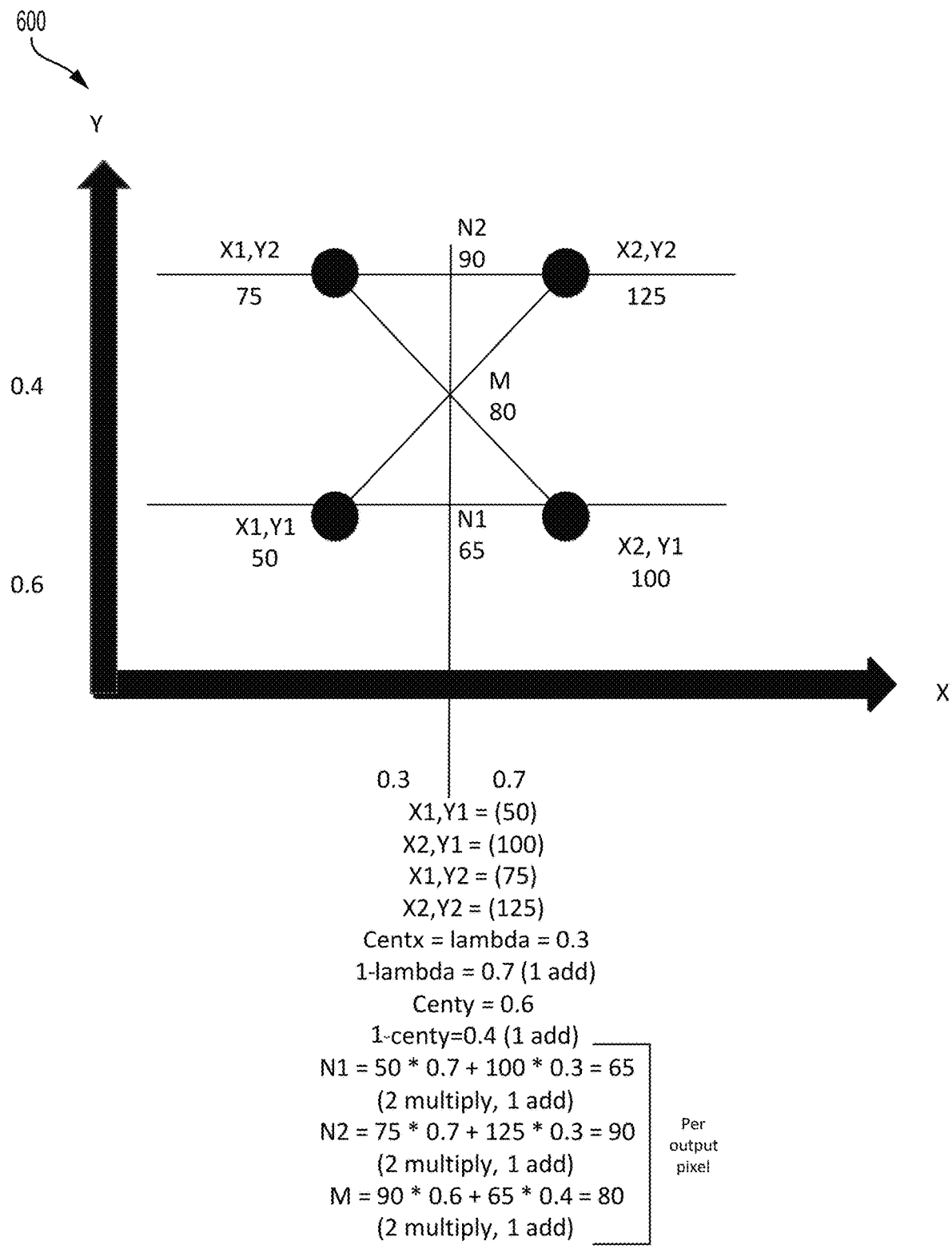
FIG. 6 is a graph illustrating an example of bilinear shift, in accordance with aspects of the present disclosure.
Figure 7:
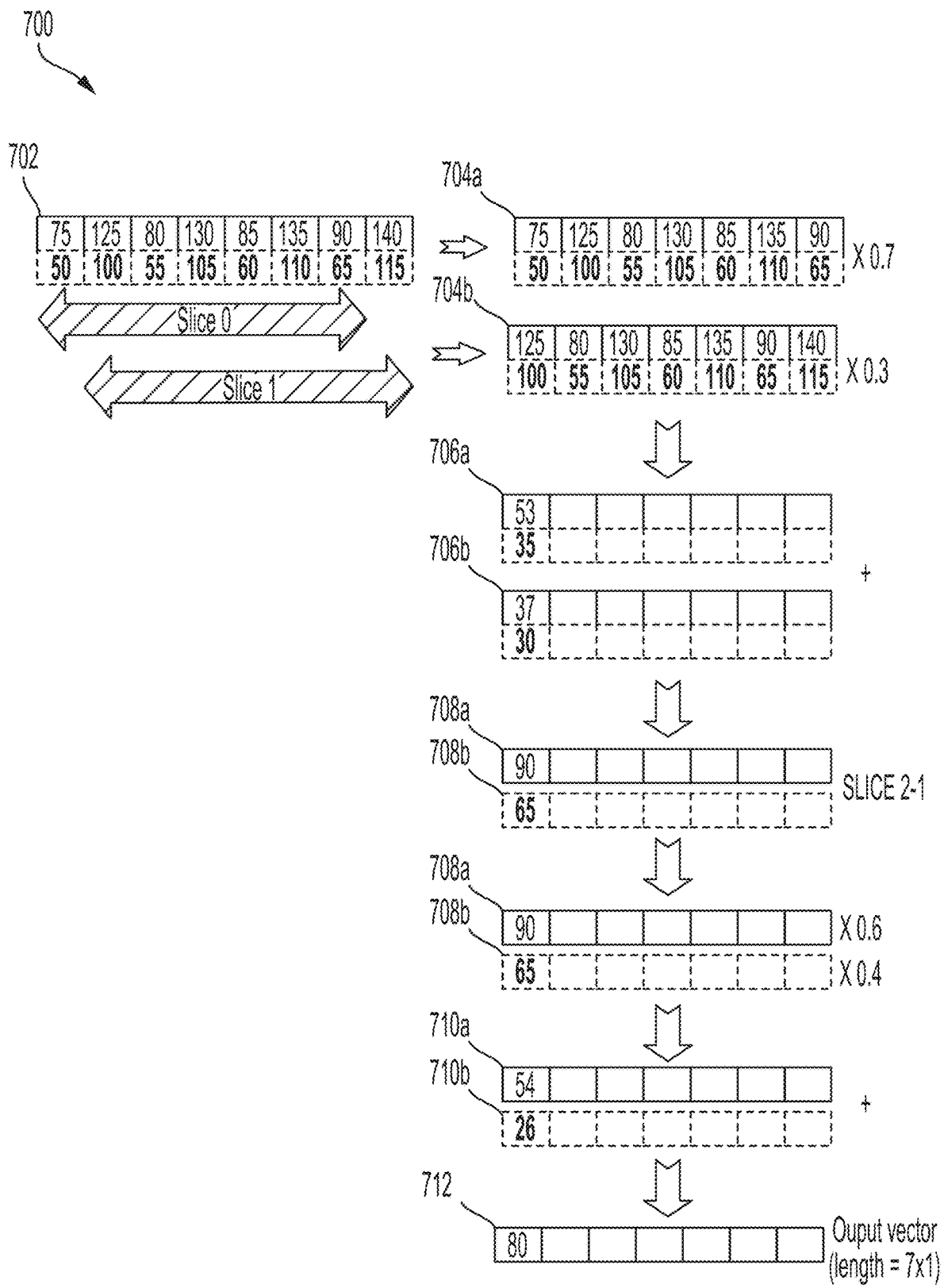
FIG. 7 is a block diagram illustrating an example of bilinear shift applied to a two-dimensional input, in accordance with aspects of the present disclosure.
Figure 8A:
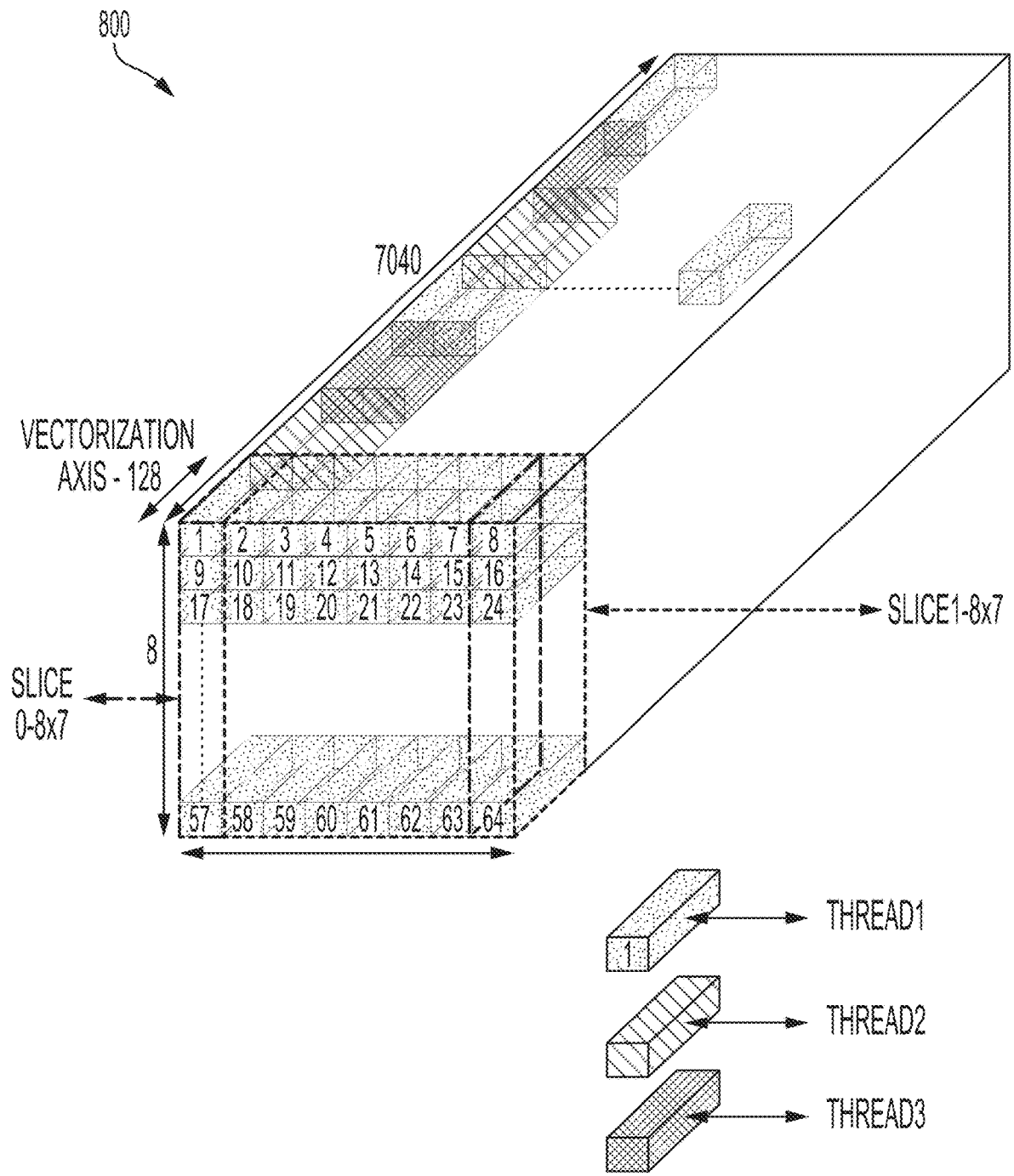
FIGS. 8A-8B are block diagrams illustrating an example in which a three-dimensional input is processed via the bilinear shift and further vectorized and threaded, in accordance with aspects of the present disclosure.
Figure 8B:
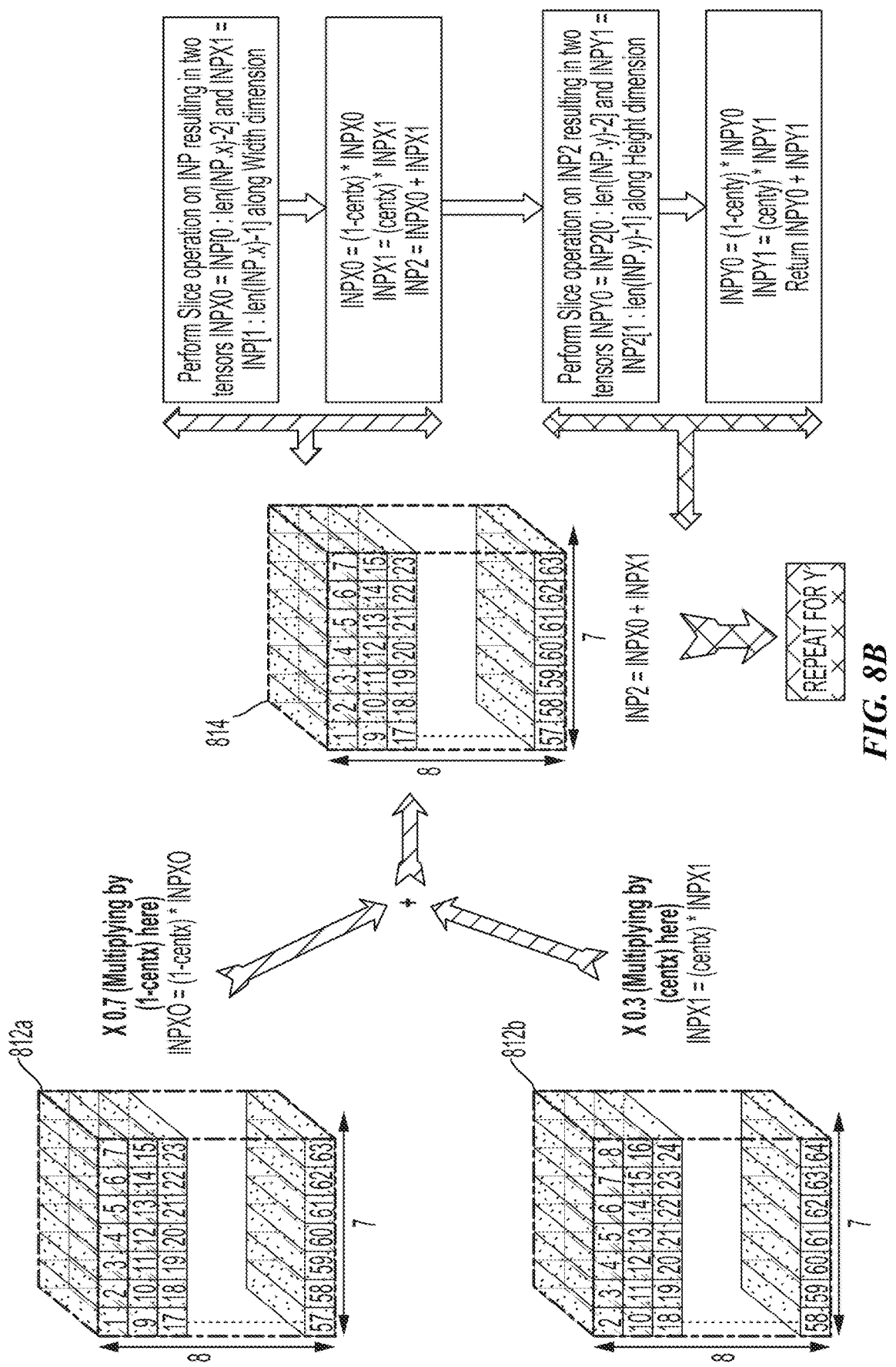

FIG. 6 is a graph illustrating an example bilinear shift 600, in accordance with aspects of the present disclosure. Referring to FIG. 6, four points corresponding to (X1,Y1), (X2,Y1), (X1,Y2) and (X2,Y2) are shown. The four points may be used to determine a location of a point M. Each point may, for instance, correspond to a pixel and may have an associated value. As shown in the example of FIG. 6, the four points (X1,Y1), (X2,Y1), (X1,Y2) and (X2,Y2), may respectively have a quantized value of 75, 50, 125, and 100. Of course, the values shown in FIG. 6, as well as in the following examples of FIGS. 7 and 8A-8B, are merely provided for ease of explanation and not limiting. The four points may serve as inputs for the bilinear shift 600. Using the four points, an interpolation operation is performed in the x-dimension. In the example of FIG. 6, given a value centx=0.3 and centy=0.6, the corresponding complements may be computed. The complement of centx may be determined as 1-centx=0.7 and the complement of centy may be determined as 1-centy=0.4. Performing the interpolation as described, for example in block 504 of FIG. 5, a point N1 may be determined. That is, the point N1 may be computed as N1=(1-centx)*(X1,Y1)+(centx)*(X2,Y1)=65. Similarly, a point N2 may be computed as N2=(1-centx)*(X1,Y2)+(centx)*(X2,Y2)=90.

Using the computed points N1 and N2, the point M may be determined by interpolating in the y-dimension. That is, the center point M may be computed as M=N2(centy)+N1*(1-centy)=80.

FIG. 7 is a block diagram illustrating an example bilinear shift applied using multiple points, in accordance with aspects of the present disclosure. Referring to FIG. 7, the bilinear shift is applied to multiple points in a two-dimensional plane. In the example of FIG. 7, the bilinear shift, as described in FIG. 6, is applied to transform an 8×2 vector to a 7×1 vector via a vectorized interpolation operation. A 2D input 702 may be received. The input tensor may be sliced in the x dimension to produce two slices 704a, 704b. The slice 704b is offset from slice 704a by 1. For instance, slice 704a includes rows 1-7 of the input tensor 702 and slice 704b includes rows 2-8 of the input tensor 702. Slice 704b may be element-wise multiplied by the value centx (e.g., 0.3), and slice 704a may be element-wise multiplied by the complement (1-centx) (e.g., 0.7). For ease of illustration, two of the results of the elementwise multiplication operations are shown in each of interpolated portions 706a and 706b. The interpolated portions 706a and 706b are element-wise summed to produce an interpolated input in the x-dimension.

The interpolated input in the x dimension may then be sliced in the y dimension to produce slice 708a and slice 708b, which have an offset of 1 in the y-dimension. An interpolation process may be applied to the slices 708a and 708b. For instance, as shown in FIG. 7, the slice 708b is element-wise multiplied by the value cent y (e.g., 0.4) and the slice 708a is element-wise multiplied by the complement of cent y (e.g., 1-centy=0.6).

The interpolated slices in the y-dimension 710a and 710b, For ease of illustration, two of the results of the elementwise multiplication operations are shown in each of interpolated portions 706a 706b. The interpolated portions 710a and 710b are element-wise summed to generate an output vector 712. In the example of FIG. 7, the bilinear shift process is applied to transform an 8×2 tensor to 7×1 tensor.

FIGS. 8A-8B are block diagrams illustrating an example bilinear shift applied to multiple points in a 3D plane. As shown in FIG. 8A, a three-dimensional array 800 may be received as an input. The input may, for example, be an 8×8×N array. Of course, the values and sizes of the array are merely an example, for ease of illustration and not limiting. Rather, aspects of the present disclosure may be applied to inputs of any size, with any specified values. Referring to FIG. 8B, the input 800 may be sliced in the x dimension to produce two tensors, slice 812a and slice 812b. The slice 812a and slice 812b have an offset of one in the x-dimension. For instance, the slice 812a may include columns 1-7 of the input 800 and slice 812b may include columns 2-8 of the input 800. In some aspects, slice 812a, and 812b may have the same size.

The values centx and its complement (e.g., 1-centx) may be respectively applied to slices 812b and 812a to produce an interpolated input in the x-dimension (814). The interpolated input in the x-dimension (814) may be subjected a slice operation and interpolated in the y-direction. In this way, the 3D input 800 may be processed via the bilinear shift and further vectorized, for improved processing efficiency and reduced energy consumption.

Figure 9:
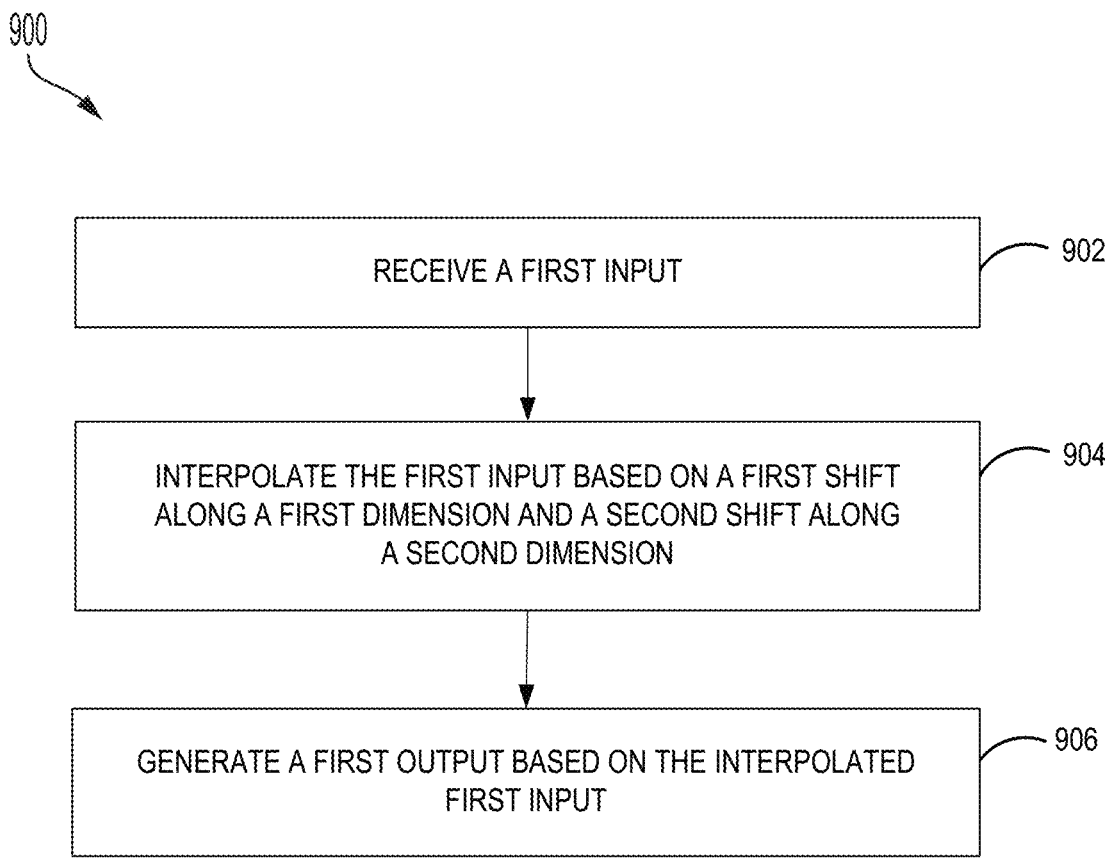
FIG. 9 is a flow diagram illustrating an example method for providing bilinear shift for optical flow estimation, in accordance with aspects of the present disclosure.

FIG. 9 is a flow diagram illustrating an example process 900 for providing bilinear shift for optical flow estimation, in accordance with aspects of the present disclosure. As shown in FIG. 9, at block 902, a first input is received. For instance, as described with reference to FIG. 5, at block 502, a first input tensor INP may be received.

At block 904, the first input is interpolated based on a first shift along a first dimension and a second shift along a second dimension. For example, as described with reference to FIG. 5, at block 504, the input may be interpolated along the x-direction based on a shift along the x-dimension (centx) and a complement of the shift (1-centx). The first tensor INPX0=(1-centx)*INPX0 and the second tensor INPX1=(centx)*INPX1 may be used to determine a second input tensor INP2, where INP2=INPX0+INPX1.

A similar process to blocks 502 and 504 may be then be performed on the second input along the y-dimension. That is, at block 506, second input tensor INP2 may be processed. The second input tensor INP2 may be subjected to the slice operation. The slice operation may slice or separate the second input tensor into two tensors, a third tensor INPY0=INP2[0:len(INP.y)-2], and a fourth tensor INPY1=INP2[1:len(INP.y)-1] along the y-dimension. In some aspects, the third tensor INPY0 and the fourth tensor INPY1 may be equal in size. In addition, the third tensor INPX0 and the fourth tensor INPX1 may be indexed by a one pixel offset.

At block 508, the input may be interpolated along the y-direction based on a shift along the y-dimension (centy) and a complement of the shift (1-centy). As such, the third tensor INPY0=(1-centy)*INPY0 and the fourth tensor INPY1=(centy)*INPY1 may be used to determine a third input tensor INP3, where INP3=INPY0+INPY1.

At block 906, a first output is generated based on the interpolated first input. As described with reference to FIG. 5, a third input tensor INP3 is generated following the interpolation in the x-dimension and the y-dimension. The third input tensor INP3 may be returned as an output for further processing.

Implementation examples are provided in the following numbered clauses:

1. A computer-implemented method comprising:
   receiving a first input;
   interpolating the first input based on a first shift along a first dimension and a second shift along a second dimension; and
   generating a first output based on the interpolated first input.
2. The computer-implemented method of clause 1, further comprising:
   slicing the first input to form a first tensor and a second tensor, the first tensor and the second tensor being indexed by a first offset along the first dimension;
   shifting the first tensor and the second tensor along the first dimension;
   generating an intermediate input based on the shifted first tensor and the shifted second tensor;
   slicing the intermediate input to form a third tensor and a fourth tensor, the third tensor and the fourth tensor being indexed by a second offset along the second dimension;
   shifting the third tensor and the fourth tensor along the second dimension; and
   generating the first output based on the shifted third tensor and the shifted fourth tensor.
3. The computer-implemented method of clause 1 or 2, further comprising:
   receiving a second input;
   interpolating the second input based on the first shift along the first dimension and the second shift along the second dimension; and
   generating a second output based on the interpolated second input.
4. The computer-implemented method of any of clauses 1-3, in which the first input comprises a first frame of a video and the second input comprises a second frame of the video.
5. The computer-implemented method of any of clauses 1-4, further including determining an optical flow estimate based on the first output and the second output.
6. The computer-implemented method of any of clauses 1-5, further comprising:
   processing first video frame and the second frame; and
   generating a reconstructed second frame based on the optical flow estimate.
7. The computer-implemented method of any of clauses 1-6, in which the optical flow estimate is conducted on a vectorized basis.
8. An apparatus, comprising:
   a memory; and
   at least one processor coupled to the memory, the at least one processor configured:
   to receive a first input;
   to interpolate the first input based on a first shift along a first dimension and a second shift along a second dimension; and
   to generate a first output based on the interpolated first input.
9. The apparatus of clause 8, in which the at least one processor is further configured:
   to slice the first input to form a first tensor and a second tensor, the first tensor and the second tensor being indexed by a first offset along the first dimension;
   to shift the first tensor and the second tensor along the first dimension; to generate an intermediate input based on the shifted first tensor and the shifted second tensor;
   to slice the intermediate input to form a third tensor and a fourth tensor, the third tensor and the fourth tensor being indexed by a second offset along the second dimension;
   to shift the third tensor and the fourth tensor along the second dimension; and
   to generate the first output based on the shifted third tensor and the shifted fourth tensor.
10. The apparatus of clause 8 or 9, in which the at least one processor is further configured:
    to receive a second input;
    to interpolate the second input based on the first shift along the first dimension and the second shift along the second dimension; and
    to generate a second output based on the interpolated second input.

11. The apparatus of any of clauses 8-10, in which the first input comprises a first frame of a video and the second input comprises a second frame of the video.

12. The apparatus of any of clauses 8-11, in which the at least one processor is further configured to determine an optical flow estimate based on the first output and the second output.

13. The apparatus of any of clauses 8-12, in which the at least one processor is further configured:
to process first video frame and the second frame; and
to generate a reconstructed second frame based on the optical flow estimate.

14. The apparatus of any of clauses 8-13, in which the at least one processor is further configured to conduct the optical flow estimate on a vectorized basis.

15. A non-transitory computer-readable medium having program code recorded thereon, the program code executed by a processor and comprising:
program code to receive a first input;
program code to interpolate the first input based on a first shift along a first dimension and a second shift along a second dimension; and
program code to generate a first output based on the interpolated first input.

16. The non-transitory computer-readable medium of clause 15, in which the program code further comprises:
program code to slice the first input to form a first tensor and a second tensor, the first tensor and the second tensor being indexed by a first offset along the first dimension;
program code to shift the first tensor and the second tensor along the first dimension;
program code to generate an intermediate input based on the shifted first tensor and the shifted second tensor;
program code to slice the intermediate input to form a third tensor and a fourth tensor, the third tensor and the fourth tensor being indexed by a second offset along the second dimension;
program code to shift the third tensor and the fourth tensor along the second dimension; and
program code to generate the first output based on the shifted third tensor and the shifted fourth tensor.

17. The non-transitory computer-readable medium of clause 15 or 16, in which the program code further comprises:
program code to receive a second input;
program code to interpolate the second input based on the first shift along the first dimension and the second shift along the second dimension; and
program code to generate a second output based on the interpolated second input.

18. The non-transitory computer-readable medium of any of clauses 15-17, in which the first input comprises a first frame of a video and the second input comprises a second frame of the video.

19. The non-transitory computer-readable medium of any of clauses 15-18, further comprising program code to determine an optical flow estimate based on the first output and the second output.

20. The non-transitory computer-readable medium of any of clauses 15-19, further comprising:
program code to process first video frame and the second frame; and
program code to generate a reconstructed second frame based on the optical flow estimate.

21. The non-transitory computer-readable medium of any of clauses 15-20, further comprising program code to conduct the optical flow estimate on a vectorized basis.

22. An apparatus, comprising:
means for receiving a first input;
means for interpolating the first input based on a first shift along a first dimension and a second shift along a second dimension; and
means for generating a first output based on the interpolated first input.

23. The apparatus of clause 22, further comprising:
means for slicing the first input to form a first tensor and a second tensor, the first tensor and the second tensor being indexed by a first offset along the first dimension;
means for shifting the first tensor and the second tensor along the first dimension;
means for generating an intermediate input based on the shifted first tensor and the shifted second tensor;
means for slicing the intermediate input to form a third tensor and a fourth tensor, the third tensor and the fourth tensor being indexed by a second offset along the second dimension;
means for shifting the third tensor and the fourth tensor along the second dimension; and
means for generating the first output based on the shifted third tensor and the shifted fourth tensor.

24. The apparatus of clause 22 or 23, further comprising:
means for receiving a second input;
means for interpolating the second input based on the first shift along the first dimension and the second shift along the second dimension; and
means for generating a second output based on the interpolated second input.

25. The apparatus of any of clauses 22-24, in which the first input comprises a first frame of a video and the second input comprises a second frame of the video.

26. The apparatus of any of clauses 22-25, further comprising means for determining an optical flow estimate based on the first output and the second output.

27. The apparatus of any of clauses 22-26, further comprising:
means for processing first video frame and the second frame; and
means for generating a reconstructed second frame based on the optical flow estimate.

28. The apparatus of any of clauses 22-27, further comprising means for processing the optical flow estimate on a vectorized basis.

In one aspect, the receiving means, interpolating means, generating means the means for slicing, means for shifting, and/or processing means may be the CPU 102, program memory associated with the CPU 102, the dedicated memory block 118, and or NPU 108 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus.

The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A computer-implemented method comprising:
   receiving a first input;
   interpolating the first input based on a first shift along a first dimension and a second shift along a second dimension;
   generating a first output based on the interpolated first input,
   wherein the first dimension is a width dimension and the second dimension is a height dimension;
   slicing the first input to form a first tensor and a second tensor, the first tensor and the second tensor being indexed by a first offset along the width dimension;
   shifting the first tensor and the second tensor along the width dimension;
   generating an intermediate input based on the shifted first tensor and the shifted second tensor;
   slicing the intermediate input to form a third tensor and a fourth tensor, the third tensor and the fourth tensor being indexed by a second offset along the height dimension;
   shifting the third tensor and the fourth tensor along the height dimension;
   generating the first output based on the shifted third tensor and the shifted fourth tensor receiving a second input;
   interpolating the second input based on the first shift along the width dimension and the second shift along the height dimension; and
   generating a second output based on the interpolated second input.

2. The computer-implemented method of claim 1, in which the first input comprises a first frame of a video and the second input comprises a second frame of the video.

3. The computer-implemented method of claim 2, further including determining an optical flow estimate based on the first output and the second output.

4. The computer-implemented method of claim 3, further comprising:
   processing first video frame and the second frame; and
   generating a reconstructed second frame based on the optical flow estimate.

5. The computer-implemented method of claim 3, in which the optical flow estimate is conducted on a vectorized basis.

6. An apparatus, comprising:
   a memory; and
   at least one processor coupled to the memory, the at least one processor configured:

to receive a first input;
to interpolate the first input based on a first shift along a first dimension and a second shift along a second dimension;
to generate a first output based on the interpolated first input,
wherein the first dimension is a width dimension and the second dimension is a height dimension;
to slice the first input to form a first tensor and a second tensor, the first tensor and the second tensor being indexed by a first offset along the width dimension;
to shift the first tensor and the second tensor along the width dimension;
to generate an intermediate input based on the shifted first tensor and the shifted second tensor;
to slice the intermediate input to form a third tensor and a fourth tensor, the third tensor and the fourth tensor being indexed by a second offset along the height dimension;
to shift the third tensor and the fourth tensor along the height dimension;
to generate the first output based on the shifted third tensor and the shifted fourth tensor;
to receive a second input;
to interpolate the second input based on the first shift along the width dimension and the second shift along the height dimension; and
to generate a second output based on the interpolated second input.

7. The apparatus of claim 6, in which the first input comprises a first frame of a video and the second input comprises a second frame of the video.

8. The apparatus of claim 7, in which the at least one processor is further configured to determine an optical flow estimate based on the first output and the second output.

9. The apparatus of claim 8, in which the at least one processor is further configured:
to process first video frame and the second frame; and
to generate a reconstructed second frame based on the optical flow estimate.

10. The apparatus of claim 8, in which the at least one processor is further configured to conduct the optical flow estimate on a vectorized basis.

11. A non-transitory computer-readable medium having program code recorded thereon, the program code executed by a processor and comprising:
program code to receive a first input;
program code to interpolate the first input based on a first shift along a first dimension and a second shift along a second dimension; and
program code to generate a first output based on the interpolated first input,
wherein the first dimension is a width dimension and the second dimension is a height dimension;
program code to slice the first input to form a first tensor and a second tensor, the first tensor and the second tensor being indexed by a first offset along the width dimension;
program code to shift the first tensor and the second tensor along the width dimension;
program code to generate an intermediate input based on the shifted first tensor and the shifted second tensor;
program code to slice the intermediate input to form a third tensor and a fourth tensor, the third tensor and the fourth tensor being indexed by a second offset along the height dimension;
program code to shift the third tensor and the fourth tensor along the height dimension;
program code to generate the first output based on the shifted third tensor and the shifted fourth tensor;
program code to receive a second input;
program code to interpolate the second input based on the first shift along the width dimension and the second shift along the height dimension; and
program code to generate a second output based on the interpolated second input.

12. The non-transitory computer-readable medium of claim 11, in which the first input comprises a first frame of a video and the second input comprises a second frame of the video.

13. The non-transitory computer-readable medium of claim 12, further comprising program code to determine an optical flow estimate based on the first output and the second output.

14. The non-transitory computer-readable medium of claim 13, further comprising:
program code to process first video frame and the second frame; and
program code to generate a reconstructed second frame based on the optical flow estimate.

15. The non-transitory computer-readable medium of claim 13, further comprising program code to conduct the optical flow estimate on a vectorized basis.

16. An apparatus, comprising:
means for receiving a first input;
means for interpolating the first input based on a first shift along a first dimension and a second shift along a second dimension;
means for generating a first output based on the interpolated first input,
wherein the first dimension is a width dimension and the second dimension is a height dimension;
means for slicing the first input to form a first tensor and a second tensor, the first tensor and the second tensor being indexed by a first offset along the width dimension;
means for shifting the first tensor and the second tensor along the width dimension;
means for generating an intermediate input based on the shifted first tensor and the shifted second tensor;
means for slicing the intermediate input to form a third tensor and a fourth tensor, the third tensor and the fourth tensor being indexed by a second offset along the height dimension;
means for shifting the third tensor and the fourth tensor along the height dimension;
means for generating the first output based on the shifted third tensor and the shifted fourth tensor
means for receiving a second input;
means for interpolating the second input based on the first shift along the width dimension and the second shift along the height dimension; and
means for generating a second output based on the interpolated second input.

17. The apparatus of claim 16, in which the first input comprises a first frame of a video and the second input comprises a second frame of the video.

18. The apparatus of claim 17, further comprising means for determining an optical flow estimate based on the first output and the second output.

19. The apparatus of claim 18, further comprising:
means for processing first video frame and the second frame; and means for generating a reconstructed second frame based on the optical flow estimate.

20. The apparatus of claim 18, further comprising means for processing the optical flow estimate on a vectorized basis.

* * * * *